LE ROY MERROW
DUMPING DEVICE.
APPLICATION FILED JAN. 24, 1912.
1,129,886.
Patented Mar. 2, 1915.
3 SHEETS—SHEET 3.
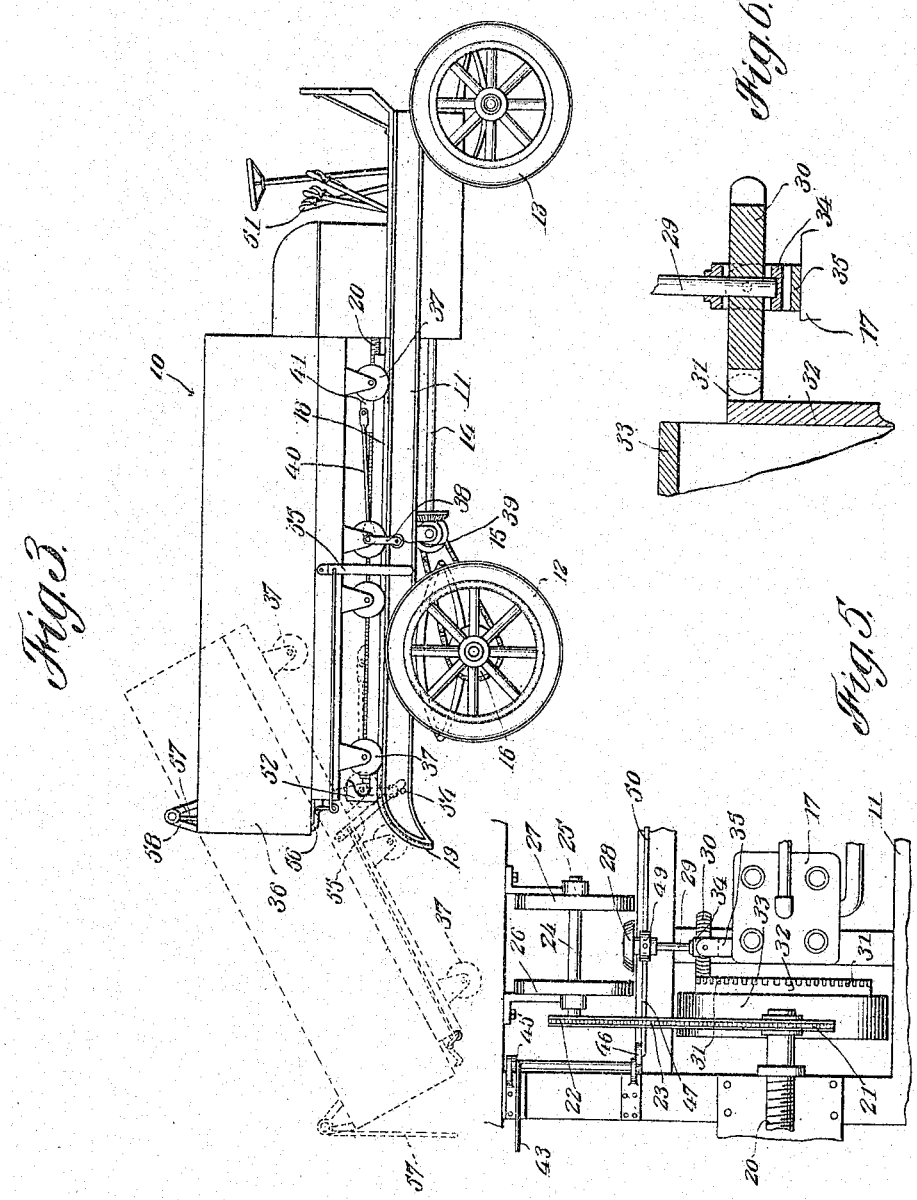

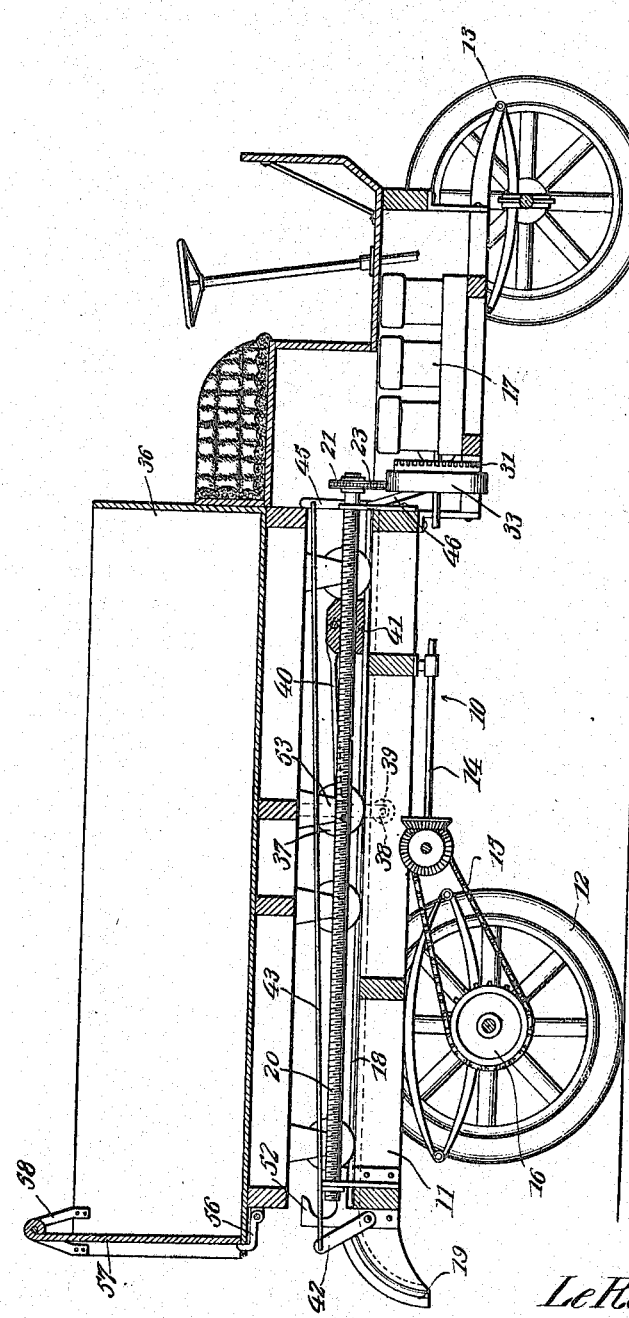

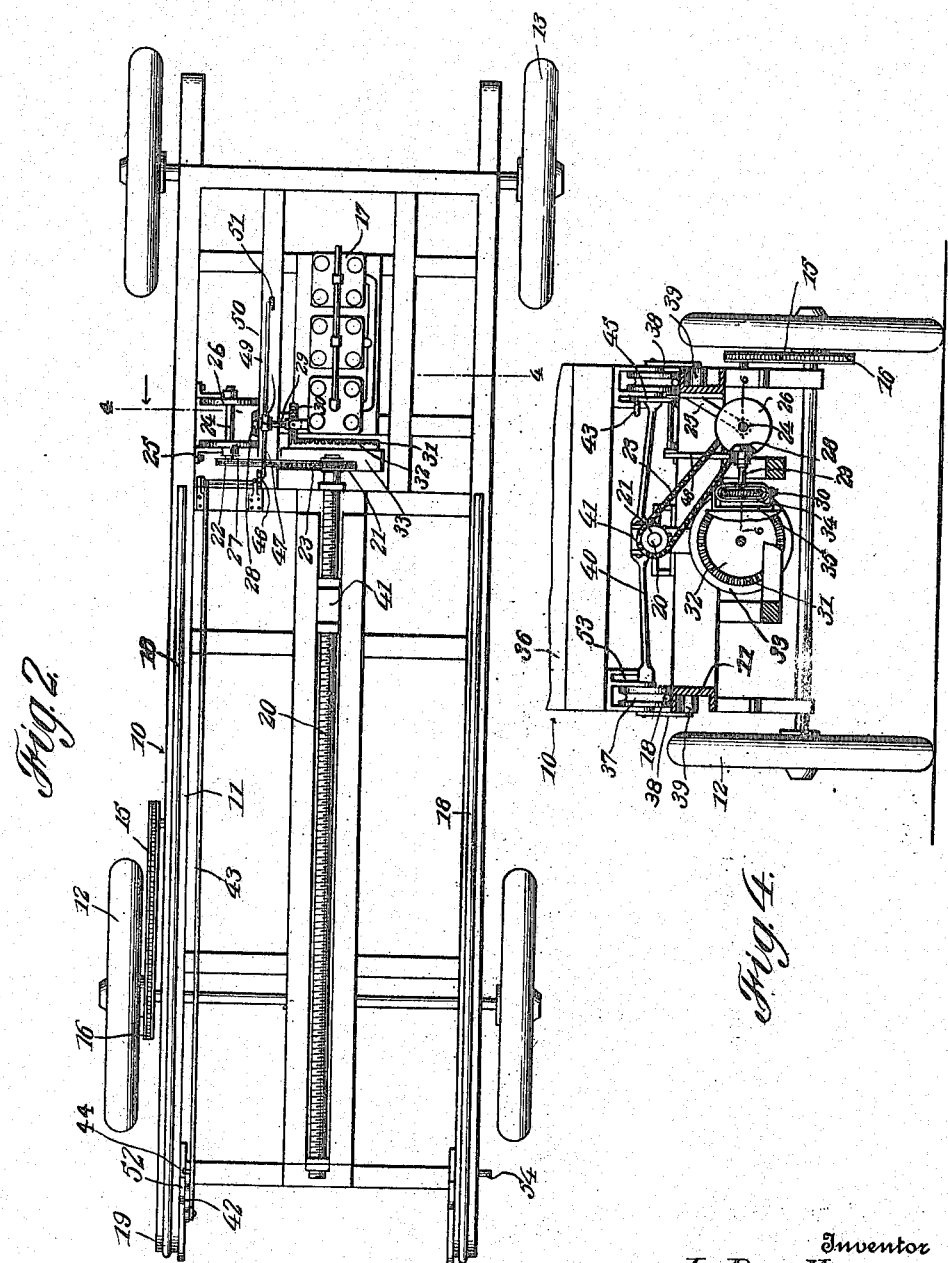

UNITED STATES PATENT OFFICE.

LE ROY MERROW, OF SPRINGFIELD, OHIO.

DUMPING DEVICE.

1,129,886. Specification of Letters Patent. Patented Mar. 2, 1915.

Application filed January 24, 1912. Serial No. 673,146.

*To all whom it may concern:*

Be it known that I, LE ROY MERROW, a citizen of the United States, residing at Springfield, in the county of Clark and State of Ohio, have invented new and useful Improvements in Dumping Devices, of which the following is a specification.

An object of the invention is to provide a dumping vehicle, particularly adaptable for use in dumping coal and the like.

The invention embodies more particularly the use of a dumping mechanism in connection with a self-propelled vehicle, the engine for propelling the vehicle being adapted to operate the dumping mechanism.

A further embodiment of the invention resides in the provision of a dumping body which can be operated by the engine of the vehicle to move into dumping position and then return to normal position, the tailboard of the dumping body being automatically swung into open position when the dumping body is moved into open position, to permit the contents of the dumping body to gravitationally discharge therefrom.

In the further disclosure of the invention, reference is to be had to the accompanying drawings constituting a part of this specification, in which similar characters of reference denote corresponding parts in all the views, and in which—

Figure 1 is a vertical longitudinal sectional view of my device, showing the dumping body in normal position. Fig. 2 is a plan view of the vehicle frame, the dumping body having been removed therefrom. Fig. 3 is a side elevation of the vehicle, showing the dumping body in dumping position. Fig. 4 is a vertical transverse sectional view taken on the line 4—4 in Fig. 2, looking in the direction of the arrow. Fig. 5 is an enlarged fragmentary plan view of the actuating and reversing mechanism. Fig. 6 is an enlarged fragmentary sectional view taken on the line 6—6 in Fig. 4.

Referring more particularly to the views, I provide a vehicle body 10, consisting of a frame 11, mounted on wheels 12, 13, a suitable driving mechanism 14 being connected by means of a chain 15 to a sprocket 16 with which the wheels 12 are mounted to rotate, the driving mechanism 14 being connected to an engine 17, mounted on the forward end of the frame 11, so that when the engine 17 is operated, rotation will be imparted to the wheels 12 to move the vehicle body 10 over the ground.

Mounted on the frame 11 is a track 18, terminating at the rear end in curved depending members 19, preferably formed integrally with the track 18, the frame 11 at the rear end being also curved to accommodate the depending members 19. Journaled on the frame 11 and arranged centrally thereof is a longitudinally extending screw rod 20, a toothed wheel 21 being keyed to the front end of the screw rod and having connection with a toothed wheel 22 through the medium of a chain 23, the toothed wheel 22 being keyed to a shaft 24. The shaft 24 is journaled in bearings 25, secured to the frame 11 and mounted to rotate with the shaft are friction disks 26, 27, adapted to be engaged by a beveled friction wheel 28 mounted to rotate with a shaft 29, having rigidly secured thereto a toothed wheel 30, the teeth of which are curved and mesh with teeth 31 formed on a toothed wheel 32 keyed to the shaft of the engine 17, adjacent a fly wheel 33 also rigidly secured to the engine shaft. The toothed wheel 30 is mounted within a frame 34, having the shaft 29 journaled therein, the mentioned frame 34 being mounted to swing on a bracket 35 secured to the frame of the engine.

A dumping body 36 has wheels 37 mounted to rotate thereon, the said wheels being arranged to operate over the track 18 and secured to the dumping body 36 at a medial portion thereof are depending brackets 38, rollers 39 being mounted on the lower ends of the brackets 38 and adapted to engage the under sides of the track 18 to retain the dumping body in engagement with the track when the same is moved into dumping position as will be disclosed hereinafter. Mounted to swing on the under side of the dumping body 36, adjacent the brackets 38 are rods 40, pivotally connected to a coupling block 41, threadedly mounted on the screw rod 20 and adapted to operate over the same when the screw rod is rotated, the operation of the coupling block 41 over the screw rod being adapted to advance the dumping body 36 along the track 18.

Pivotally mounted on the rear end of the track 18 adjacent one of the depending members 19 is a lever 42. Pivotally connected to the lever 42 is a rod 43 to which is secured a lug 44, the front end of the rod being pivotally connected to an arm 45, pivotally mounted on the frame 11 and provided with an offset arm 46 to which is connected a rod 47 the said rod being provided with a coupling member 49, journaled on the shaft 29 and having connected thereto a rod 50 connected to an operating lever 51. Secured to the frame 11 and extending upwardly therefrom, adjacent the inner ends of the depending members 19 are hook members 52, the said hook members being adapted to be engaged by brackets 53 formed on the under side of the dumping body 36 and to which the rods 40 are pivotally connected.

In the use of my device, assuming that the dumping body is in the position shown in Fig. 1, when it is desired to move the dumping body into dumping position, the operating lever 51 is actuated to move the friction wheel 28 from neutral position between the friction disks 26, 27, into engagement with one of the friction disks, preferably the friction disk 27 and thus it will be seen that rotation will be imparted to the friction disks to rotate the same in one direction, through the medium of the shaft 29 having the toothed wheel 30 keyed thereto, the mentioned toothed wheel being in mesh with the toothed wheel 32, rotating with the shaft of the engine 17. Thus at the moment that the toothed wheel 28 engages the friction disk 27, the screw rod 20 will be operated and the dumping body 36 being connected to the screw rod through the medium of the rods 40 and the coupling block 41, will be advanced along the track 18 toward the rear end of the frame 11. Secured to one side of the frame 11, adjacent one of the hook members 52 and extending outwardly therefrom is a pin 54 adapted to be engaged by an arm 55 of a hook 56, pivotally mounted on the rear end of the dumping body 36, the mentioned hook 56 being adapted to retain a tailboard 57 in closed position, the said tailboard being dependingly mounted to swing on hangers 58 secured to the rear end of the dumping body 36. Thus as the dumping body 36 moves rearwardly on the track 18, when the pin 54 is engaged by the arm 55, the tailboard 57 will be unlocked and when the center of the dumping body reaches the hook members 52, the dumping body will tilt as shown in Fig. 3, to dump the contents thereof, the said dumping body being prevented from leaving the track by the hook members 52 engaging the brackets 53 and the rollers 39 engaging the under side of the track 18 as will be readily understood. Now when the operating lever 51 was operated to engage the wheel 28 with the friction disk 27, the lug 44, through the medium of the rod 43 was moved to lie in front of one of the hook members 52 and when the dumping body 36 reaches the tilting position as mentioned, one of the brackets 53 will engage the lug 44 to move the same rearwardly, thus actuating the rod 43, which in turn swings the wheel 28 to neutral position between the disks 26 and 27, thus stopping the tilting mechanism and permitting the engine 17 to run free. When the contents of the dumping body have been gravitationally dumped therefrom, the operator throws the operating lever 51 in the reverse direction to move the wheel 28 into engagement with the friction disk 26, thus imparting a reverse rotation to the shaft 24 and also to the screw 20, which having the dumping body 36 connected thereto by the coupling block 41 and arms 40, swings the dumping body into horizontal position on the track and through the rotation of the screw 20, the dumping body will be advanced along the track to reassume its normal position as shown in Fig. 1, the operating lever 51 being then thrown into neutral position to move the wheel 28 out of engagement with the friction disk 26, thus permitting the engine 17 to run free and preventing a further advancement of the dumping body along the track 18.

From the foregoing description it will be readily seen that a device is provided whereby the dumping body can be moved into dumping position by the action of the engine which is adapted to operate the vehicle, the dumping body being automatically brought to a halt when the same has assumed a dumping position and the tailboard of the dumping body being automatically released to swing into open position at the moment that the dumping body assumes a tilting position.

I claim:—

A motor operated dumping wagon including a wheeled frame, a dumping section movably mounted thereon, a motor, a connection intermediate the wheels and motor for propelling the vehicle in the operation of the motor, a motor fly wheel mounted on said connection, means for moving the dumping section to and from dumping position, driving elements for said moving means including spaced friction disks, a shaft mounted for pivotal and rotary movement with relation to the motor, a toothed wheel carried by said shaft, toothed projections carried by the fly wheel to mesh with said toothed wheel under all pivotal movements of the shaft, and a friction disk carried by the free end of the shaft and playing between the first mentioned friction disks, and means for pivotally operating said shaft.

In testimony whereof I affix my signature in presence of two witnesses.

LE ROY MERROW.

Witnesses:
 FLORA WHITE,
 HENRY GRULIE.